United States Patent
Feierbach

[19]

[11] Patent Number: 5,815,725
[45] Date of Patent: Sep. 29, 1998

[54] APPARATUS AND METHOD FOR REDUCING POWER CONSUMPTION IN MICROPROCESSORS THROUGH SELECTIVE GATING OF CLOCK SIGNALS

[75] Inventor: Gary F. Feierbach, Belmont, Calif.

[73] Assignee: Sun Microsystems, Inc., Mountain View, Calif.

[21] Appl. No.: 627,078

[22] Filed: Apr. 3, 1996

[51] Int. Cl.$^6$ ..................................................... G06F 1/00
[52] U.S. Cl. ..................... 395/750.04; 395/556; 395/560
[58] Field of Search ..................... 395/750, 556, 395/559, 560; 364/707

[56] References Cited

U.S. PATENT DOCUMENTS

| | | | |
|---|---|---|---|
| 5,247,655 | 9/1993 | Khan et al. ................................ | 395/550 |
| 5,347,232 | 9/1994 | Nishimichi ................................... | 331/1 |
| 5,452,434 | 9/1995 | MacDonald .............................. | 395/550 |
| 5,511,209 | 4/1996 | Mensch, Jr. ............................... | 395/800 |
| 5,561,792 | 10/1996 | Ganapathy ............................... | 395/550 |
| 5,603,037 | 2/1997 | Aybay ....................................... | 395/750 |

OTHER PUBLICATIONS

"Vesusvius–LS Pentium Processor PCI Systme Controller", Pico Power, pp. 54–67, Mar. 1995.

Primary Examiner—Meng-Ai T. An
Assistant Examiner—Jigar Pancholi
Attorney, Agent, or Firm—Flehr Hohbach Test Albritton & Herbert LLP; William S. Galliani

[57] ABSTRACT

A circuit to reduce the power consumption of a microprocessor includes activity monitor circuitry to generate an activity signal in response to a low activity operational state of the microprocessor. A clock controller connected to the activity monitor circuitry produces a periodic clock gating signal from the activity signal. Clock gating circuits intermittently apply the internal clock signal to the microprocessor logic circuitry in response to the periodic clock gating signal.

7 Claims, 3 Drawing Sheets

APPARATUS AND METHOD FOR REDUCING POWER CONSUMPTION IN MICROPROCESSORS THROUGH SELECTIVE GATING OF CLOCK SIGNALS

BRIEF DESCRIPTION OF THE INVENTION

This invention relates generally to reducing power consumption in microprocessors. More particularly, this invention relates to a technique for reducing power consumption in microprocessors by selectively gating the clock signals of the microprocessor during low activity states.

BACKGROUND OF THE INVENTION

A microprocessor is the central control circuit of a computer. Microprocessors continue to grow in speed. When a microprocessor is implemented in CMOS circuitry, the power it consumes is directly proportional to the speed at which it operates. Thus, growing microprocessor speeds have resulted in microprocessors that consume relatively large amounts of power.

When microprocessors are used in portable computers, it is highly desirable to preserve battery life by reducing the power consumption of a microprocessor. Device packaging considerations also make it desirable to reduce microprocessor power consumption. Modern microprocessors have large power densities. Large power densities make microprocessors susceptible to overheating. Microprocessor overheating can result in inferior device performance.

It is known in the art to preserve microprocessor power by halting a microprocessor's clock during low activity states. This approach is problematic if the microprocessor stores dynamic information which must be periodically refreshed by the gating of a clock signal. That is, if the clock is stopped, refresh operations cannot be performed to preserve the dynamic information stored by the microprocessor. Another problem with this approach is that no computations are performed while the microprocessor is halted.

Microprocessors are commonly driven by an external clock. The clock signal generated by the external clock is applied to a phase-locked loop circuit positioned on the microprocessor. A phase-locked loop circuit eliminates clock skew by comparing the external clock signal to a feedback reference clock signal. The output of the phase-locked loop circuit is an internal clock signal with a phase that minimizes the difference in phase between the external clock signal and the feedback reference clock signal.

A phase-locked loop circuit only operates when there is a relatively small phase difference between the incoming clock signal and the feedback clock signal. Thus, for microprocessors that use an external clock, it is not possible to stop the external clock to conserve power, because stopping the external clock eliminates the requisite phase relationship at the phase-locked loop.

In view of the foregoing, it would be highly desirable to provide a microprocessor with reduced power consumption. Such a device could be used to preserve battery life and to avoid inferior device performance caused by heat proliferation. Ideally, such a device would enable refresh operations to preserve dynamic information and would otherwise continuously operate to execute logical functions. Finally, such a device should function without disrupting the operation of the microprocessor phase-locked loop.

SUMMARY OF THE INVENTION

The invention is a method and apparatus to reduce the power consumption of a microprocessor. The apparatus includes activity monitor circuitry to generate an activity signal in response to a low activity operational state of the microprocessor. A clock controller connected to the activity monitor circuitry produces a periodic clock gating signal from the activity signal. Clock gating circuits intermittently apply the internal clock signal to the microprocessor logic circuitry in response to the periodic clock gating signal.

Thus, the invention provides reduced microprocessor power consumption in the presence of low activity operational states. Consequently, battery life is preserved and microprocessor heat proliferation problems are avoided. Instead of shutting down the microprocessor, the microprocessor is periodically clocked. Thus, the invention enables refreshing of dynamic circuitry. In addition, the periodically clocked microprocessor is able to complete logical functions. Finally, the approach of the invention maintains the operability of phase-locked loop circuitry.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
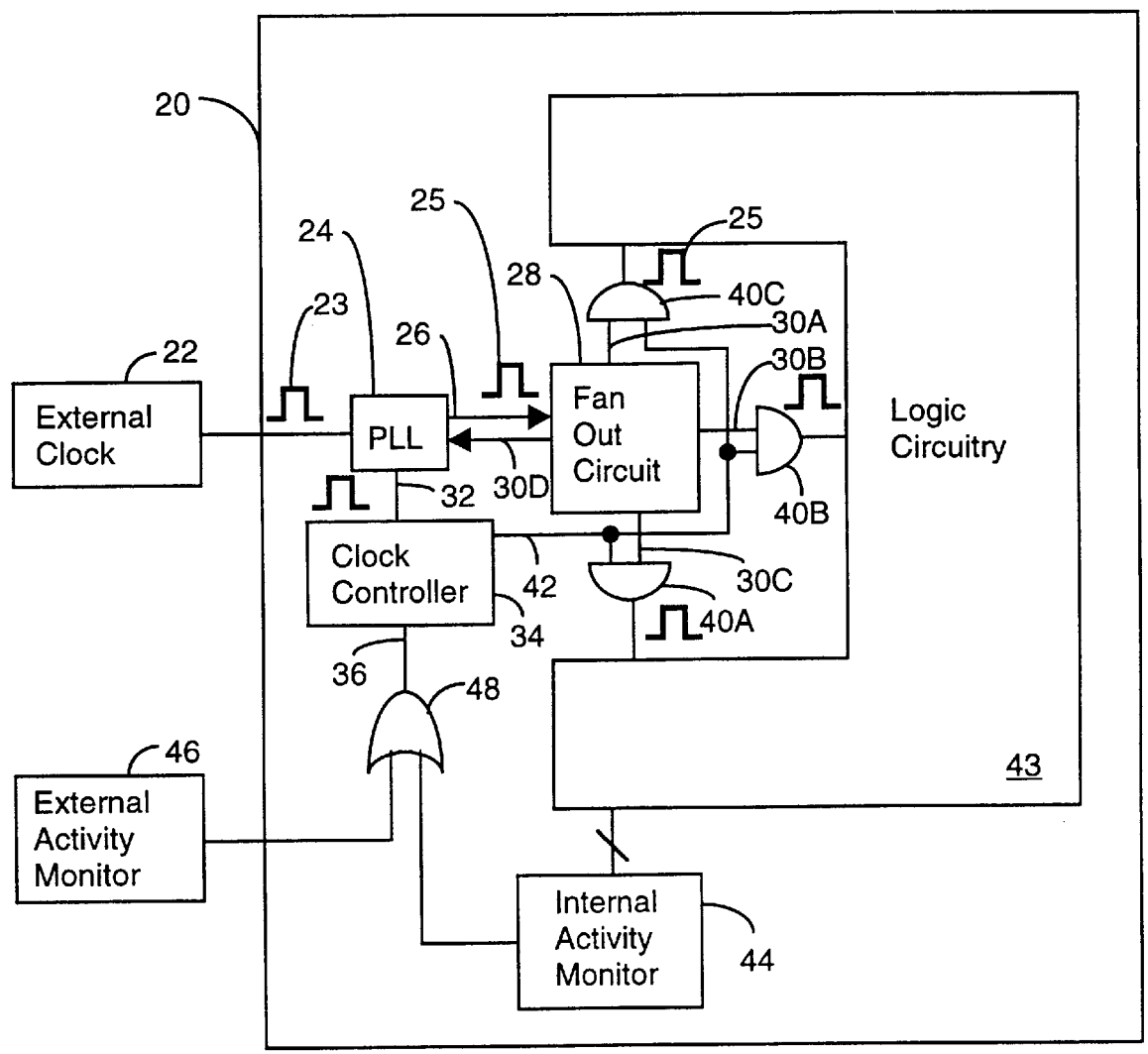
FIG. 1 illustrates a microprocessor with selective clock gating in accordance with one embodiment of the invention.

FIG. 1 illustrates a microprocessor 20 with selective clock gating in accordance with one embodiment of the invention. As used herein, the term "microprocessor" generally refers to any control or logic circuit. However, the invention is most applicable to large microprocessors of the type that constitute the Central Processing Unit (CPU) of a personal computer or workstation.

An externally generated clock signal 23 is applied to the microprocessor 20 from an external clock 22. The externally generated clock signal 23 is processed by a phase-locked loop circuit 24. The phase-locked loop circuit 24 generates an internal clock signal 25 on a phase-locked loop output line 26. As known in the art, the internal clock signal 25 generated by the phase-locked loop circuit 24 is synchronized with a reference signal, described below.

The internal clock signal 25 is applied to a fan out circuit 28. The fan out circuit 28 is typically implemented as an amplifier with a large number of output lines, in this example shown as output lines 30A–30D. Line 30D forms a feedback line that carries a reference signal back to the phase-locked loop circuit 24.

A clock controller line 32 is positioned between the phase-locked loop 24 and the clock controller 34. The phase-locked loop 24 applies an internal clock signal 25 to the clock controller 34. The clock controller 34 is also connected to an activity signal line 36. The activity signal line 36 carries an activity signal indicative of a low activity operational state of the microprocessor.

The clock controller 34 responds to the activity signal by selectively disabling a set of clock gating circuits, in this example shown as logical AND gates 40A, 40B, and 40C. In the embodiment of FIG. 1, the clock controller 34 disables the clock gating circuits by applying a digital low signal to the clock controller output line 42. The digital low signal causes the outputs of the logical AND gates 40A, 40B, and 40C to be a digital low signal. That is, even though one input of each logical AND gate 40A, 40B, and 40C is receiving the internal clock signal 25, the output of each logical AND gate is a digital low signal because of the digital low signal generated by the clock controller 34. When the clock gating circuits 40A, 40B, and 40C are disabled in this manner, the internal clock signal is not applied to the microprocessor logic circuitry 43. Thus, most of the circuitry associated with the microprocessor 20 is not operated. Consequently, power is preserved in this state.

The clock controller 34 also generates a periodic clock gating signal on clock controller output line 42. The periodic clock gating signal causes the clock gating circuits to periodically apply a clock signal to the microprocessor logic circuitry 43. Thus, for the embodiment of the invention shown in FIG. 1, the clock controller 34 will periodically generate a digital high signal on the clock controller output line 42. The digital high signal, which is coordinated with the internal clock signal 25, causes each clock gating circuit 40A, 40B, and 40C to have two digital high inputs. Thus, the clock signal is passed by the clock gating circuits 40A, 40B, and 40C to the microprocessor logic circuitry 43. The periodic clock gating signal may be derived as function of a predetermined number of clock cycles. Note that the periodic clock gating signal provides a refresh signal for any dynamic circuitry associated with the microprocessor logic circuitry 43. Further note that the periodic clock gating signal allows the microprocessor logic circuitry 43 to periodically perform logical operations. Thus, instead of being completely shut down, the microprocessor is always available for limited computational tasks.

The clock controller 34 of the invention preferably receives an activity signal from activity monitor circuitry including an internal activity monitor 44 and an external activity monitor 46. The individual signals from the monitors may be combined by a logic gate 48.

The internal activity monitor 44 identifies a low activity operational state within the microprocessor logic circuitry 43. For example, the internal activity monitor 44 may monitor the frequency of cache misses and derive a conclusion regarding the operational state of the microprocessor. The internal activity monitor 44 also identifies growing operational states within the microprocessor logic circuitry 43 which results in a change of the activity signal.

The external activity monitor 46 identifies low processing requirements associated with external elements controlled by the microprocessor. For example, the external activity monitor 46 may monitor the frequency of hard disc accesses and reach a conclusion regarding the operational state of the microprocessor 20. The external activity monitor 46 also identifies growing processing requirements associated with the external elements controlled by the microprocessor logic circuitry 43. In such a case, the activity signal value is toggled to insure that all processing requirements can be met at full microprocessor speed.

In the embodiment of FIG. 1, standard operating conditions result in the internal activity monitor 44 and the external activity monitor 46 each generating a digital high signal. Conversely, low activity operational states cause a digital low signal to be generated. If both an internal activity monitor 44 and an external activity monitor 46 are used, then a logical OR gate 48 may be used to combine the signals from the monitors. In the example of FIG. 1, if either monitor 44 or 46 observes normal operating conditions, then the activity signal generated at the output of logical OR gate 48 is a logical high value. The clock controller 34 passes this logical high value to the clock controller output line 42. This logical high value is then combined with the internal clock signal at each clock gating circuit 40A, 40B, and 40C, which causes the internal clock signal to be applied to the microprocessor logic circuitry 43. Periodic clock signals are applied to the microprocessor logic circuitry 43 when both activity monitors 44 and 46 produce a digital low value.

Figure 2:
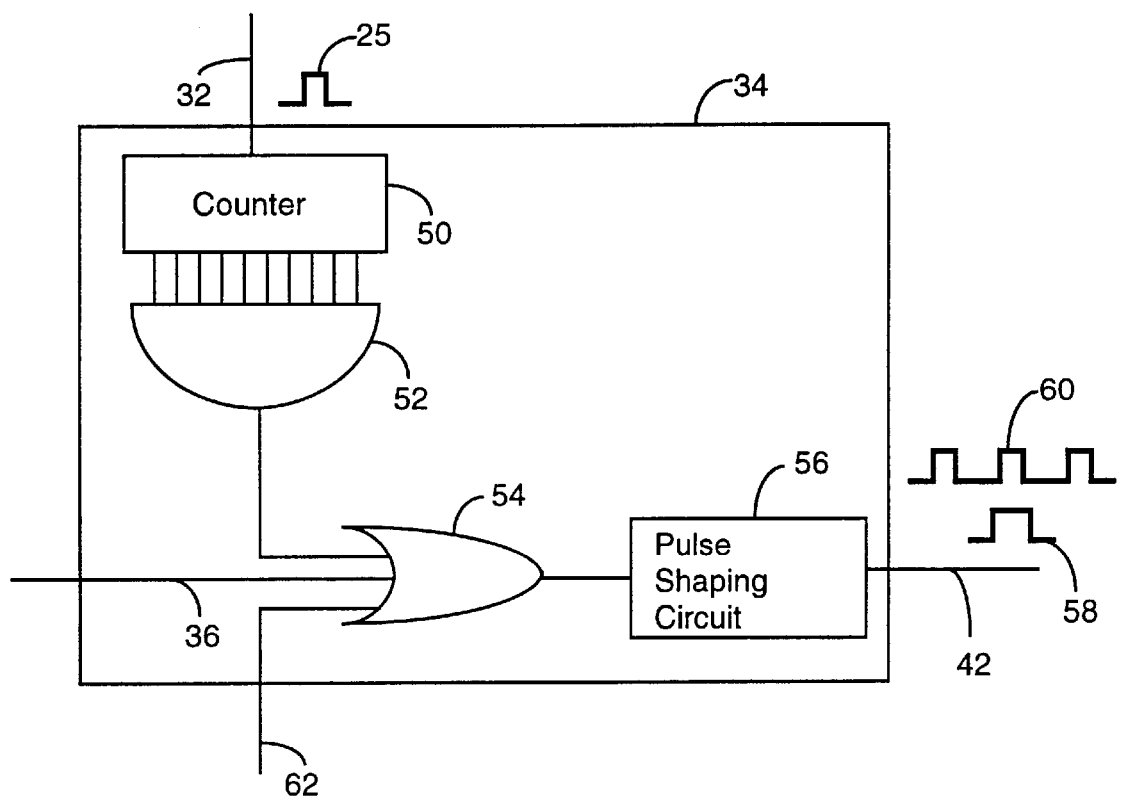
FIG. 2 illustrates a clock controller in accordance with one embodiment of the invention.

A clock controller 34 to achieve this functionality is illustrated in FIG. 2. In this embodiment, the activity signal is carried on line 36 to one input of a logical OR gate 54. If the activity signal has a digital high value, then the output of the logical OR gate will be a digital high value. This digital high value will cause the clock gating circuits 40 to observe a continuous digital high value at one input node. When a clock signal is received by the clock gating circuits 40, the other input node is high, thereby producing an internal clock signal at each clock gating circuit output node.

If the activity signal has a low digital value, indicative of a low activity operational state of the microprocessor, then the logical OR gate 54 will only generate a digital high value when its other input node has a digital high value. FIG. 2 illustrates a counter 50 that receives the internal clock signal 25 on line 32. The counter counts a predetermined number of clock cycles, for example 256, and then generates a digital high counter output signal. The digital high signal causes the logical OR circuit 54 to generate a digital high value, which will in turn enable a clock signal to be passed through the clock gating circuits 40. Note that this digital high value is only passed after a predetermined number of clock cycles. Thus, a periodic clock gating signal is said to be generated.

The counter 50 of FIG. 2 is implemented as a Gray's counter. Only one output bit of a Gray's counter changes with each clock cycle. Thus, smooth signal transitions are observed. When all output bits of the Gray's counter have a digital high value, the logical AND gate produces a digital high signal. This occurs one time every predetermined number of clock cycles.

FIG. 2 illustrates a pulse shaping circuit 56. The pulse shaping circuit 56 operates to extend the pulse width of its input signal. The pulse shaping circuit 56 may be implemented as a Schmidt trigger. FIG. 2 illustrates an extended pulse width signal 58. The figure also illustrates a multiple pulse internal clock signal 60. By providing a broader pulse width for the periodic clock gating signal, synchronization with the internal clock signal 25 is more readily achieved.

Figure 3:
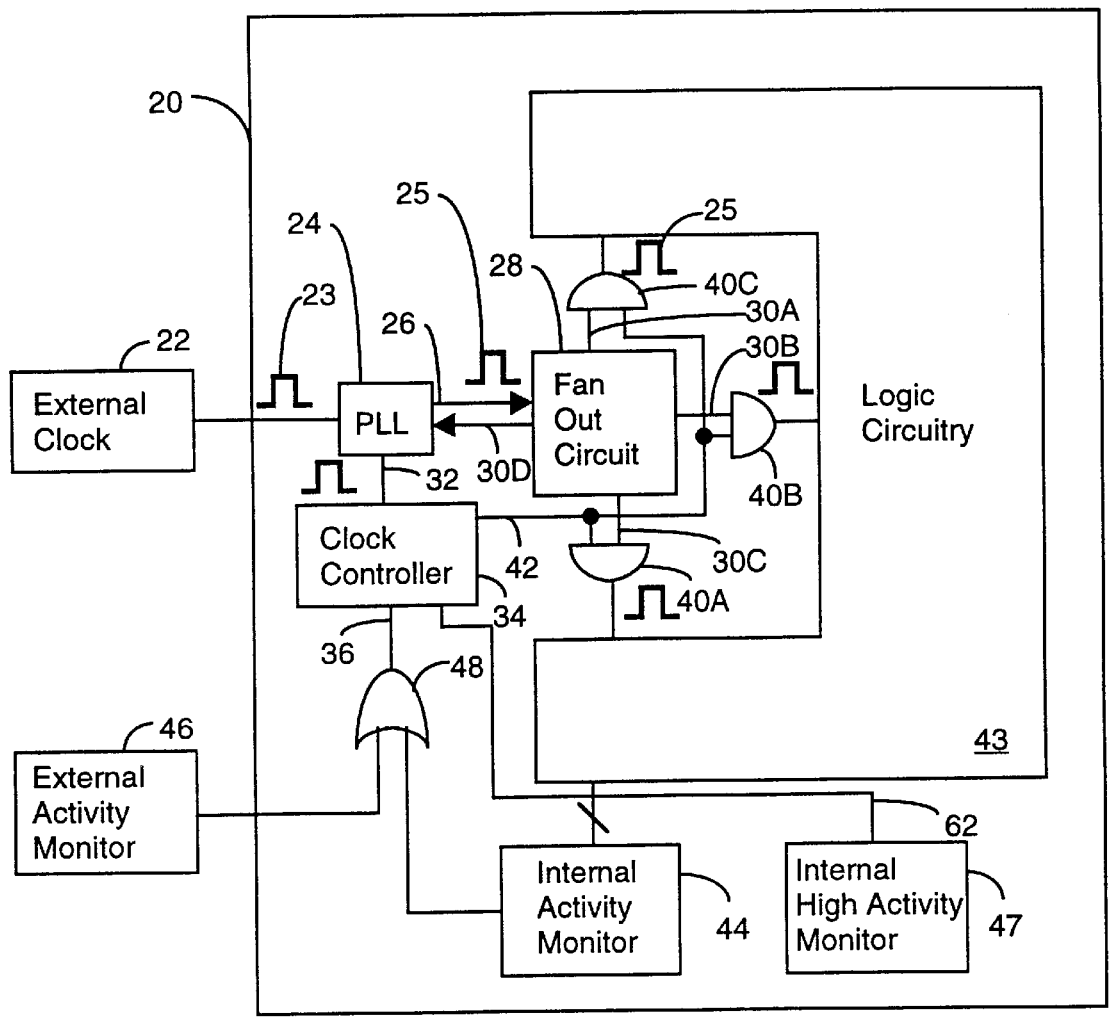
FIG. 3 illustrates a microprocessor with selective clock gating in accordance with a second embodiment of the invention.

FIG. 3 illustrates another embodiment of the invention. FIG. 3 generally corresponds with FIG. 1, but includes a separate internal high activity monitor 47. The internal high activity monitor 47 is used to temporarily override a low activity state. In other words, the internal high activity monitor 47 can suspend the periodic clock gating signal to implement a full clock signal in the presence of interrupts or other demanding activity of relatively short duration. The internal high activity monitor 47 may be implemented to respond to an interrupt signal, a memory access signal, or related event of short duration.

The desired functionality for the internal high activity monitor 47 may be implemented in any number of ways. One possible implementation is to generate a digital high signal on output line 62. The output line 62 is electrically connected to the logical OR gate 54 of FIG. 2. The digital high signal on line 62 overrides a digital low signal on line 36.

Note that the invention may be implemented with dynamic count values. That is, a high count value for long delays between periodic clock gating signals may be used in low activity states. A small count value for small delays between periodic clock gating signals may be used for activity states that require more computational activity than required for the low activity states.

The invention has now been fully disclosed. Those skilled in the art will recognize a number of benefits associated with the invention. First, the invention provides power conservation in microprocessors. Thus, battery life can be preserved and problems arising from heat proliferation may be avoided. In addition, note that the processing of the invention occurs after the phase-locked loop circuit 24. Thus, the operation of the phase-locked loop circuit 24 is not affected. The invention is also advantageous in that it provides refresh operations for dynamic circuitry associated with the microprocessor logical circuitry 43. Moreover, the periodic clock gating signals of the invention provide ongoing computational operations.

For purposes of explanation, the foregoing description used specific nomenclature to provide a thorough understanding of the invention. However, it will be apparent to those skilled in the art that the specifically disclosed details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

I claim:

1. A circuit to reduce the power consumption of a microprocessor, comprising:

a phase-locked loop circuit within said microprocessor to produce an internal clock signal from an externally generated clock signal;

activity monitor circuitry within said microprocessor to generate an activity signal in response to a low activity operational state of said microprocessor;

a clock controller within said microprocessor and connected to said phase-locked loop circuit and said activity monitor circuitry, said clock controller producing a periodic clock gating signal from said internal clock signal and said activity signal; and clock gating circuits within said microprocessor and connected to said phase-locked loop circuit and said clock controller, said clock gating circuits periodically applying said internal clock signal to microprocessor logic circuitry in response to said periodic clock gating signal such that said microprocessor logic circuitry receives a periodically clocked microprocessor clock for ongoing computational operations with reduced power consumption.

2. The apparatus of claim 1 wherein said activity monitor circuitry includes internal activity monitor circuitry to identify a low activity operational state within said microprocessor logic circuitry.

3. The apparatus of claim 2 further comprising external activity monitor circuitry to identify low processing requirements associated with external elements controlled by said microprocessor.

4. The apparatus of claim 3 wherein said activity monitor circuitry includes a logic gate to process the output of said internal activity monitor and said external activity monitor.

5. The apparatus of claim 1 wherein said clock controller includes a counter to produce a counter output signal at a predetermined count value of said internal clock signal.

6. The apparatus of claim 5 wherein said clock controller includes a logic circuit to produce said periodic clock gating signal in response to said counter output signal and said activity signal.

7. The apparatus of claim 6 wherein said clock controller includes a pulse shaping circuit to extend the pulse width of said periodic clock gating signal.

\* \* \* \* \*